US009093728B2

(12) United States Patent
Alkemade et al.

(10) Patent No.: US 9,093,728 B2
(45) Date of Patent: Jul. 28, 2015

(54) BATTERY MODULE

(75) Inventors: Ulrich Alkemade, Leonberg (DE); Ulrich Sauter, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 712 days.

(21) Appl. No.: 12/998,666

(22) PCT Filed: Sep. 14, 2009

(86) PCT No.: PCT/EP2009/061853
§ 371 (c)(1),
(2), (4) Date: Jul. 5, 2011

(87) PCT Pub. No.: WO2010/054877
PCT Pub. Date: May 20, 2010

(65) Prior Publication Data
US 2011/0260731 A1  Oct. 27, 2011

(30) Foreign Application Priority Data
Nov. 17, 2008 (DE) .......................... 10 2008 043 789

(51) Int. Cl.
H01M 10/052 (2010.01)
H01M 10/613 (2014.01)
H01M 2/12 (2006.01)
H01M 10/48 (2006.01)
H01M 10/615 (2014.01)
H01M 10/625 (2014.01)
H01M 10/6556 (2014.01)
H01M 10/6563 (2014.01)

(52) U.S. Cl.
CPC ............ *H01M 10/5004* (2013.01); *H01M 2/12* (2013.01); *H01M 10/052* (2013.01); *H01M 10/482* (2013.01); *H01M 10/486* (2013.01); *H01M 10/5006* (2013.01); *H01M 10/5016* (2013.01); *H01M 10/5057* (2013.01); *H01M 10/5067* (2013.01); *Y02E 60/122* (2013.01); *Y02T 10/7011* (2013.01)

(58) Field of Classification Search
CPC   H01M 2/1223; H01M 2/1282; H01M 2/1229
USPC ............................... 429/61, 62, 83, 58, 87, 88
See application file for complete search history.

(56) References Cited

U.S. PATENT DOCUMENTS 5,258,243 A * 11/1993 Cannone .......................... 429/55
5,534,364 A * 7/1996 Watanabe et al. ............... 429/61

(Continued)

FOREIGN PATENT DOCUMENTS

| DE | 10352266 A1 | 6/2005 |
| JP | 2000059917 A | 2/2000 |
| WO | 2008120054 A2 | 10/2008 |

*Primary Examiner* — Maria J Laios
*Assistant Examiner* — Robert S Carrico
(74) *Attorney, Agent, or Firm* — Maginot, Moore & Beck LLP

(57) ABSTRACT

The invention relates to a battery module, in particular for a motor vehicle, which includes a housing, at least one battery disposed in the housing, at least one inlet opening for introducing a tempering fluid into the housing, at least one outlet opening for discharging the tempering fluid from the housing, and at least one monitoring device for detecting a state of the at least one battery. According to the invention, the at least one inlet opening and the at least one outlet opening can be sealed by at least one closure element in the event of a disruption condition of the at least one battery, so that materials exiting the at least one battery, in particular gases, during the disruption state can not escape from the battery module.

14 Claims, 3 Drawing Sheets

(56) References Cited

U.S. PATENT DOCUMENTS

| | | | |
|---|---|---|---|
| 5,643,691 A | * | 7/1997 | Iwatsuki et al. ............... 429/54 |
| 6,278,259 B1 | * | 8/2001 | Kimoto et al. ............... 320/147 |
| 6,372,378 B1 | | 4/2002 | Warner et al. |
| 7,239,225 B2 | * | 7/2007 | Tirmizi ........................... 337/30 |
| 7,373,264 B2 | * | 5/2008 | Verbrugge et al. ............. 702/64 |
| 2003/0077507 A1 | * | 4/2003 | Hoh ............................... 429/120 |
| 2005/0269995 A1 | | 12/2005 | Donnelly et al. |

* cited by examiner

BATTERY MODULE

CROSS-REFERENCE TO RELATED APPLICATION

This application is a 35 USC 371 application of PCT/EP 2009/061853 filed on Sep. 14, 2009.

BACKGROUND OF THE INVENTION

1. Field of the Invention

The present invention relates to a battery module, to a battery module system, and a method for preventing damage that is caused by a battery.

2. Description of the Prior Art

In batteries, such as lithium-ion batteries, which in general are disposed in battery modules, disruptions can occur. Disruptions in batteries have manifold causes, which are often a succession of improperly occurring electrochemical reactions in the batteries. Lithium-ion batteries contain oxidants, such as $LiCoO_2$ and oxidizable materials, such as ethylene carbonate. These materials are separated from one another by a thin polymer membrane, which withstands a maximum temperature of 180° C. At higher temperatures than 180° C., because of a disruption or overcharging or undercharging of the battery, the oxidant and the oxidizable materials reach one another and react exothermically with one another, so that the temperature in the battery increases still further.

In general, batteries with a disruption are able only to output or receive or store less electrical current, if any. Moreover, because of the disruption, the electrical internal resistance of the batteries is generally increased, and/or the poles of the battery become transposed. The result of the disruption is often destruction of the battery with exothermic processes, so that the result is a major heat development and the occurrence of gases or vapors that can escape from the battery. For this purpose, batteries normally have overpressure valves, which beyond a certain pressure carry the gases or vapors out of the battery. The thermal and possibly chemical emissions escaping from the battery with the disruption can cause damage to other batteries and even destroy them, so that a destructive chain reaction between the batteries can occur. The gases and vapors that occur are in some cases highly poisonous, so that they can harm human beings.

Melting elements are known that beyond a certain temperature of the battery disconnect the battery from the electrical current-carrying lines. The melting elements are based on the physical process of melting a metal, beyond the melting temperature of the metal. Despite an electrical shutoff of the battery, poisonous gases and vapors can emerge from the battery, which can lead to considerable damage to the environment. For instance, humans can suffer damage to their health as a result.

SUMMARY OF THE INVENTION

A battery module according to the invention, in particular for a motor vehicle, including a housing, at least one battery disposed in the housing, at least one inlet opening for introducing a tempering fluid into the housing, at least one outlet opening for conducting the tempering fluid out of the housing, and at least one monitoring device for detecting a condition of the at least one battery, and the at least one inlet opening and/or the at least one outlet opening is closable by at least one closure element in a disruption condition of at least one battery detected by the at least one monitoring device, so that substances, in particular gases, escaping from the at least one battery with the disruption condition cannot escape from the battery module. A closure element at only at least one inlet opening or at only at one outlet opening can already suffice to enclose the at least one battery in fluid-tight fashion in the housing in a disruption condition, if at the at least one inlet opening or at the at least one outlet opening, for instance, a corresponding counterpressure is present, so that even without a closure element, the tempering fluid cannot flow out.

The tempering fluid serves to cool and/or heat the at least one battery.

In a further feature, at least one monitoring device includes at least one sensor for detecting the electrical voltage and/or the temperature of the at least one battery. The electrical voltage and/or the temperature of at least one battery is detected, and beyond a certain predetermined temperature or electrical voltage, a disruption of the at least one battery is reported or detected.

In a variant, the at least one monitoring device includes a sensor for detecting gases. Beyond at least one predetermined concentration of at least one predetermined gas, a disruption of the at least one battery is reported or detected.

Expediently, the sensor is disposed inside the housing or the tempering fluid conduit in the vicinity of the at least one outlet opening. The tempering fluid is carried around the batteries in order to cool and/or heat them, so that gases or vapors escaping from the batteries arrive with the tempering fluid at the sensor at the outlet opening. The sensor can also be disposed in the interior of the housing with the batteries. A tempering fluid conduit can also be considered to be a component of the housing.

In a further feature, the at least one closure element is a flap.

In a variant, the battery module has a shutoff element for disconnecting an electrical connection of the at least one battery from at least one current-carrying line for the at least one battery in a disruption condition of the at least one battery detected by the at least one monitoring device. The at least one battery, preferably all the batteries of the battery module, do not heat up further on account of a discharging or charging operation.

In one feature, the shutoff element includes a pyrotechnical propellant charge. A pyrotechnical propellant charge is inexpensive and can accomplish a very fast shutoff in a short time, for instance less than 1 second, and in particular less than 200 ms.

Expediently, the shutoff element includes a mechanical, electric or electronic switch.

In a further embodiment, the battery module includes at least one degassing conduit for diverting substances, in particular gases, escaping from the at least one battery, having a monitoring device in the degassing conduit, and the degassing conduit is closable by at least one supplementary closure element in a disruption condition of the at least one battery, so that substances, in particular gases, escaping from the at least one battery having the disruption condition cannot escape from the battery module.

In an expanded feature, the tempering fluid can be conducted through the interior of the housing by a blower.

Preferably, the battery is a lithium-ion battery.

A battery module system according to the invention having at least one battery module includes at least one battery module described in this patent application.

In a method according to the invention for preventing damage which is caused by at least one battery disposed in a housing of a battery module, and in which the condition of at least one battery is detected by a monitoring device, the at least one battery, in a disruption condition of the at least one battery detected by the at least one monitoring device, is enclosed in a fluid-tight fashion in the housing.

In a variant, at least one inlet opening for introducing a tempering fluid into the interior of the housing and at least one outlet opening for conducting the tempering fluid out of the interior of the housing and preferably at least one degassing conduit are closed in fluid-tight fashion by at least one closure element, such as a flap.

In a further feature, in a disruption condition of the at least one battery detected by the at least one monitoring device, the at least one battery is disconnected from at least one current-carrying line for charging and discharging the at least one battery.

BRIEF DESCRIPTION OF THE DRAWING

Below, one exemplary embodiment of the invention is described in further detail in conjunction with the accompanying drawings.

DESCRIPTION OF THE PREFERRED EMBODIMENTS

Figure 1:
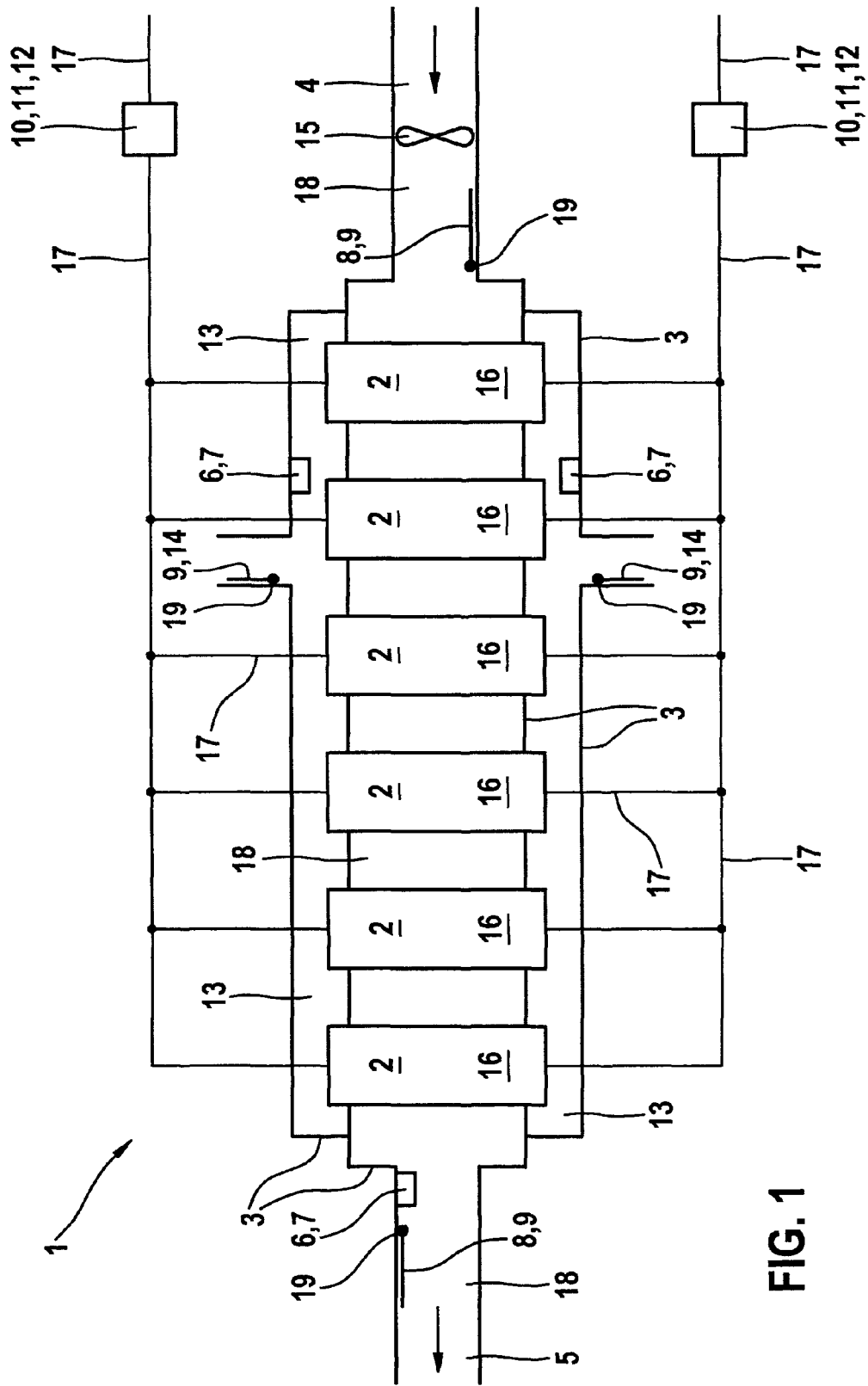
FIG. 1 is a highly schematic longitudinal section through a battery module in a normal operating state.
Figure 3:
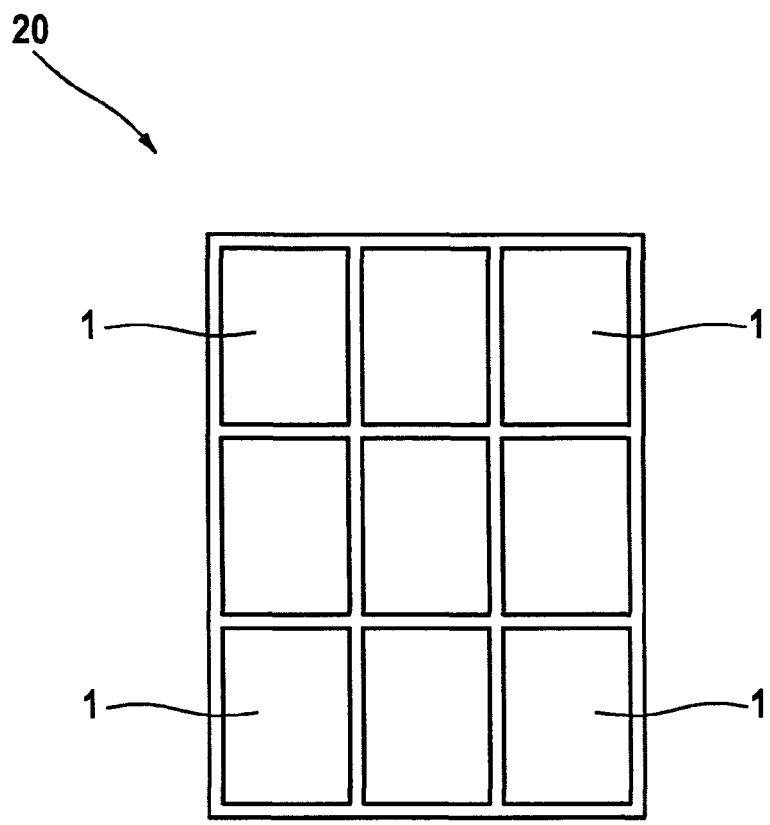
FIG. 3 is a highly schematic cross section through a battery module system.
Figure 4:
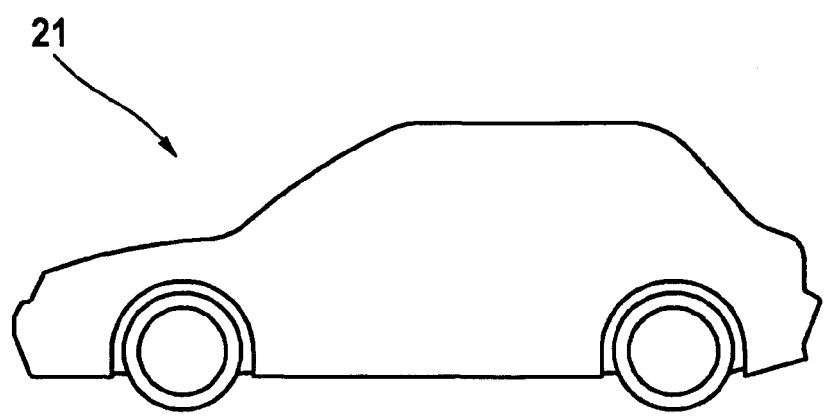
FIG. 4 shows a view of a motor vehicle.

In FIG. 1, a battery module 1 with six batteries 2, embodied as lithium-ion batteries 16, is shown. The batteries 2 of the battery module 1 are disposed in a housing 3. For instance, from four to twelve batteries 2 are disposed in battery modules 1 (six shown). A plurality of battery modules 1 can also be combined into a battery module system 20 (FIG. 3). Battery modules 1 serve for instance to supply current to motor vehicles 21, in particular hybrid motor vehicles (21), electric vehicles, or stacker trucks.

The batteries 2 of the battery module 1 are connected to a current-carrying line 17 in an electrical series circuit. Selectively, the batteries 2 of one battery module 1 can also be partly connected in parallel. The current-carrying line 17 carries the electrical current, furnished by the batteries 2, to the consumer or (not shown) charges the batteries 2. A shutoff element 10, which can be a mechanical, electric or electronic switch 12 or a shutoff element 10 with a pyrotechnical propellant charge 11, is disposed in the current-carrying lines 17 for the batteries 2. The shutoff element 10 can shut off the batteries 2 of the battery module 1; that is, the batteries 2 are disconnected from the electrical connection by means of the current-carrying line 17.

The batteries 2 disposed in the fluid-tight housing 3 of the battery module 1 are cooled and/or heated by air as a tempering fluid. Through a tempering fluid conduit 18, by means of a blower 15, the air is fed into the interior of the housing 3 and carried out of it again. The interior of the housing 3 in which the batteries 2 are disposed thus also acts as a tempering fluid conduit 18. The air flows in through an inlet opening 4 and out again through an outlet opening 5. The housing 3 is moreover provided with a degassing conduit 13. The batteries 2 have overpressure valves, not shown, which beyond a certain pressure carry gases or vapors that have occurred in the batteries 2 into the degassing conduit 13.

A monitoring means 6 detects the condition of the batteries 2. The monitoring means 6 is a sensor 7, which detects certain gases in the tempering fluid that flow through the tempering fluid conduit 18. To that end, the sensor 7 is disposed in the vicinity of the outlet opening 5 inside the housing 3 or the tempering fluid conduit 18. There is also one sensor each inside the two degassing conduits 13.

The lithium-ion batteries 16 contain oxidants, such as $LiCoO_2$, and oxidizable materials, such as ethylene carbonate. These materials are separated from one another by a thin polymer membrane, which withstands a maximum temperature of 180° C. At higher temperatures than 180° C., because of a disruption or overcharging or undercharging of the battery 2, the oxidant and the oxidizable materials reach one another and react exothermically with one another, so that the temperature rises and drives the reaction onward, as a "thermal runaway". As a result, the pressure in the lithium-ion battery or lithium-ion batteries 16 rises sharply with the disruption condition. Beyond a certain pressure, which is generally reached at around 140° C., the overpressure valves, not shown, open and allow the gases and vapors to escape into the degassing conduit 13. Leaks can also occur in the batteries 2, so that the gases and vapors can also escape into the tempering fluid conduit 18. The sensors 7 detect these gases or vapors, such as hydrocarbons, and thus detect a disruption of at least one battery 2 of the battery module 1. A control unit, not shown, is informed of this disruption. A disruption is tripped beyond a certain concentration of at least one certain gas or vapor.

In the tempering fluid conduit 18, in the vicinity of the inlet opening 4 and in the vicinity of the outlet opening 5, there is one closure means 8 each, which is capable of closing the tempering fluid conduit 18 in fluid-tight fashion. Moreover, the two degassing conduits 13 are provided with closure means 8 as supplementary closure means 14, that is, a flap 9, in order to be able to close the degassing conduits 13 in fluid-tight fashion. The closure means 8 are embodied as flaps 9 that are pivotable about a pivot axis or pivot shaft 19. The flaps 9 are moved by a motor, preferably an electric motor, not shown. In another embodiment, the flaps 9 are closed pyrotechnically or by means of a spring mechanism, which can be tripped electromagnetically, for instance. In FIG. 1, the normal operating state of the battery module 1 is shown. All the flaps 9 are open. Thus particularly the tempering air necessary for tempering the batteries 2 can be carried through the tempering fluid conduit 18, and the degassing conduit 13 is open so that it is not exposed to any unnecessary stresses.

Figure 2:
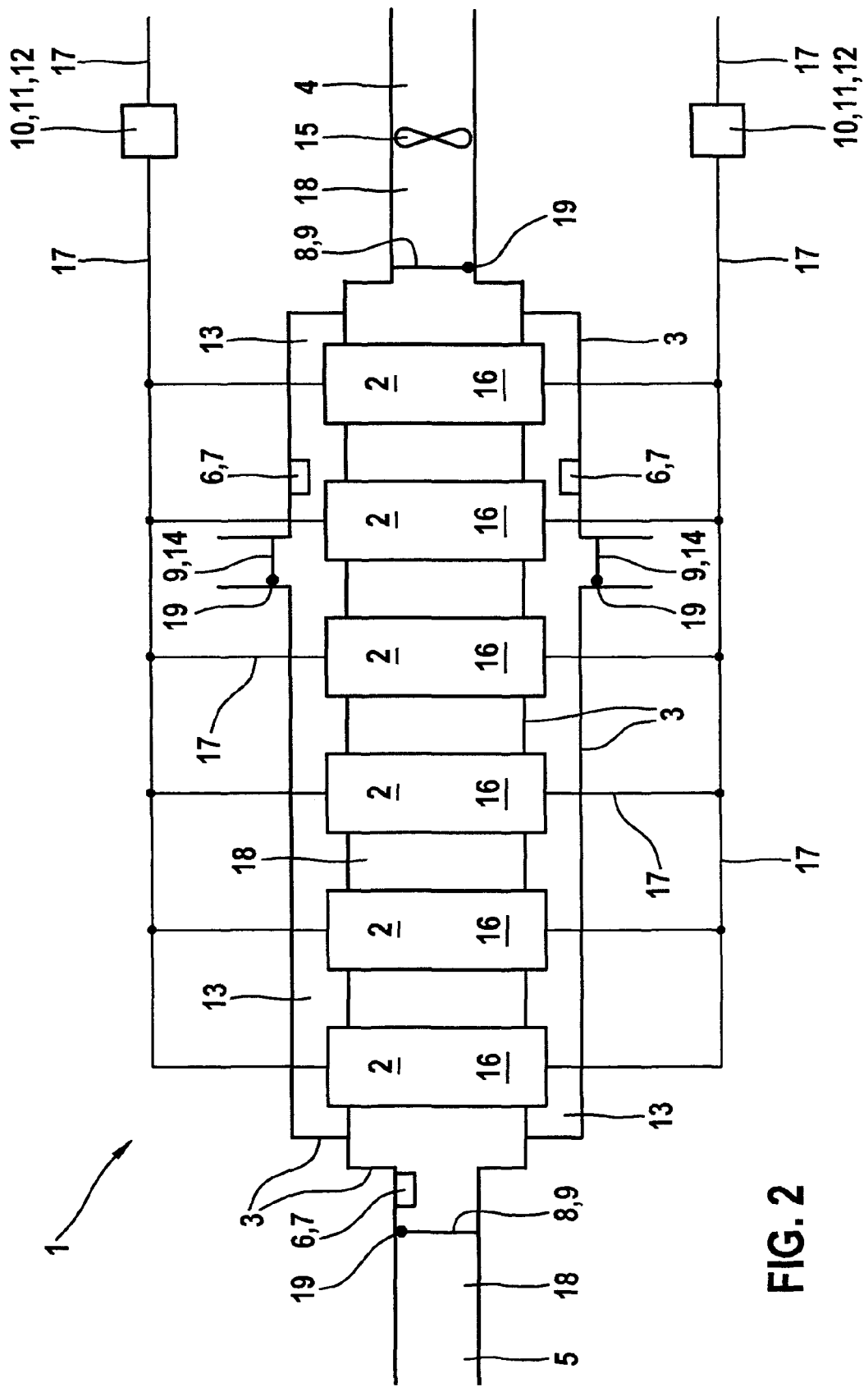
FIG. 2 shows the battery module of FIG. 2 in a disruption.

In a disruption detected by the sensors 7, and it suffices if only one sensor 7 detects a certain concentration of a certain gas, all the flaps 9 are immediately closed (FIG. 2) by the control unit. Moreover, preferably simultaneously, all the batteries 2 are electrically shut off by the shutoff element 10 embodied as an electronic switch 12. If the shutoff element 10 includes a pyrotechnical propellant charge 11, the electrical connection is exploded in a very short time, for instance less than 1 second. Disconnecting the electrical connection with the shutoff element 10 means that the batteries 2 are no longer charged, or that electrical current is no longer drawn from them. As a result, further heating of the batteries 2 because of these processes is averted. The closure of the flaps 9 causes the batteries 2 to be enclosed in the housing 3 in fluid-tight fashion. Because of this hermetic sealing off of the batteries 2 in the housing 3, poisonous gases or vapors can advantageously not reach the environment. The harmful chemical reactions that take place in the batteries 2 generally require oxygen, but because of the hermetic sealing that is limited, so that the harmful reactions that require oxygen rapidly come to an end, since the quantity of oxygen from the air in the housing 3 is quite small. The housing 3 and the closure means 8 of the battery module 1 are constructed mechanically stably enough that they withstand even major pressures occurring in the housing 3, for instance even in the event of an explosion of the battery 2.

In a second exemplary embodiment, not shown, the battery module 1 does not have a degassing conduit 13. The overpressure valves, not shown, of the batteries 2 carry gases or vapors directly into the interior of the housing 3, which also acts as a tempering fluid conduit 18. As a result, only the two air flaps 9 at the inlet opening and outlet opening 4,5 are required for hermetically sealing off the batteries 2. Otherwise, the second exemplary embodiment is analogously equivalent to the exemplary embodiment shown in FIGS. 1 and 2.

In a third exemplary embodiment, not shown, a disruption of at least one battery 2 of the battery module 1 can be detected with a sensor 7 disposed locally at the at least one battery 2. For instance, the sensor 7 can be a sensor 7 for detecting the temperature of the at least one battery 2. The closure means 8 are embodied so that the at least one battery 2, or in other words some of the batteries 2 of the battery module 1, can be partitioned off or disconnected in fluid-tight fashion from the other batteries 2 of the battery module. The shutoff element 10 is also embodied so that only the at least one battery 2 having the disruption is electrically disconnected. Thus in a disruption of at least one battery 2 of the battery module 1 having at least two batteries 2, not all the batteries 2 of the battery module 1 have to be shut off.

The details of the various exemplary embodiments can be combined with one another unless something is said to the contrary.

Considered all in all, considerable improvements in the protection and safety of battery modules 1 can be associated with the battery module 1 of the invention. The poisonous gases and vapors that occur in a disruption are caught in the housing 3 that is hermetically partitioned off in a disruption, so that they do not reach the environment, where they could cause damage.

The foregoing relates to the preferred exemplary embodiments of the invention, it being understood that other variants and embodiments thereof are possible within the spirit and scope of the invention, the latter being defined by the appended claims.

The invention claimed is:

1. A battery module for a motor vehicle, comprising:
a housing;
at least one battery disposed in the housing;
at least one inlet opening configured for introduction of a tempering fluid into the housing;
at least one outlet opening configured for conduction of the tempering fluid out of the housing;
at least one monitoring device configured to detect a disruption condition of a malfunctioning battery of the at least one battery;
at least one closure element configured to close the at least one inlet opening and the at least one outlet opening in response to detection of the disruption condition of the malfunctioning battery such that substances, including gases, escaping from the malfunctioning battery cannot escape from the battery module; and
at least one degassing conduit connecting overpressure valves of respective batteries of the at least one battery and configured to divert the substances escaping from the malfunctioning battery,
wherein the at least one monitoring device includes a first gas sensor positioned in the at least one degassing conduit and configured to detect gases in the at least one degassing conduit,
wherein the degassing conduit includes at least one supplementary closure element configured to be closed in response to the detection of the disruption condition of the malfunctioning battery such that the substances escaping from the malfunctioning battery cannot escape from the battery module, and
wherein the at least one degassing conduit is partitioned from the at least one inlet opening and the at least one outlet opening and configured such that the substances diverted by the degassing conduit do not mix with the tempering fluid between the at least one inlet opening and the at least one outlet opening.

2. The battery module as defined by claim 1, wherein the at least one monitoring device includes at least one sensor which detects the electrical voltage and/or the temperature of the at least one battery.

3. The battery module as defined by claim 1, wherein the at least one monitoring device includes a second gas sensor disposed inside the housing proximate to the at least one outlet opening.

4. The battery module as defined by claim 1, wherein the at least one closure element is a flap.

5. The battery module as defined by claim 1, further comprising:
a shutoff element configured to disconnect an electrical connection of the at least one battery from at least one current-carrying line for the at least one battery in response to detection of the disruption condition by the at least one monitoring device.

6. The battery module as defined by claim 5, wherein the shutoff element includes a pyrotechnical propellant charge.

7. The battery module as defined by claim 5, wherein the shutoff element includes a mechanical, electric, or electronic switch.

8. The battery module as defined by claim 6, wherein the shutoff element includes a mechanical, electric, or electronic switch.

9. The battery module as defined by claim 1, further comprising:
a blower configured to conduct the tempering fluid through the interior of the housing.

10. The battery module as defined by claim 1, wherein the battery is a lithium-ion battery.

11. A battery module system having a plurality of battery modules, wherein the battery module system includes at least one battery module as defined by claim 1.

12. A battery module system having a plurality of battery modules, wherein the battery module system includes at least one battery module as defined by claim 3.

13. A method for preventing damage that is caused by at least one battery disposed in a housing of a battery module, and a condition of the at least one battery is detected by a monitoring device, comprising:
detecting a disruption condition of the at least one battery with the at least one monitoring device;
closing an inlet opening and an outlet opening of the battery module with a closure element in a fluid-tight fashion in response to the detection of the disruption condition such that a tempering fluid conduit defined between the inlet opening and the outlet opening in an interior of the housing is sealed; and
closing at least one degassing conduit, which connects overpressure valves of respective batteries of the at least one battery and is configured to divert substances, including gases, escaping from the at least one battery, in fluid-tight fashion with at least one supplementary closure element in response to the detection of the disruption condition, wherein the at least one degassing conduit is partitioned from the tempering fluid conduit and configured such that no mixing of fluids occurs between the tempering fluid conduit and the at least one degassing conduit regardless of whether the at least one degassing conduit is open or closed, and wherein the at least one monitoring device includes a gas sensor positioned in the at least one degassing conduit and configured to detect gases in the at least one degassing conduit.

14. The method as defined by claim 13, further comprising:

disconnecting the at least one battery from at least one current-carrying line configured to charge and discharge the at least one battery in response to the detection of the disruption condition of the at least one battery.

* * * * *